(12) United States Patent
Wolfbauer

(10) Patent No.: US 9,629,350 B2
(45) Date of Patent: Apr. 25, 2017

(54) FISHING POLE HOLDER AND ALERT SYSTEM FOR ICE FISHING

(71) Applicant: Kenneth P. Wolfbauer, Ham Lake, MN (US)

(72) Inventor: Kenneth P. Wolfbauer, Ham Lake, MN (US)

(*) Notice: Subject to any disclaimer, the term of this patent is extended or adjusted under 35 U.S.C. 154(b) by 173 days.

(21) Appl. No.: 14/312,640

(22) Filed: Jun. 23, 2014

(65) Prior Publication Data

US 2014/0298707 A1 Oct. 9, 2014

Related U.S. Application Data

(63) Continuation-in-part of application No. 13/549,098, filed on Jul. 13, 2012, now Pat. No. 8,757,399.

(60) Provisional application No. 61/844,415, filed on Jul. 9, 2013.

(51) Int. Cl.
    *A01K 97/10* (2006.01)
    *A01K 97/12* (2006.01)
    *A01K 97/01* (2006.01)

(52) U.S. Cl.
    CPC .............. *A01K 97/10* (2013.01); *A01K 97/01* (2013.01); *A01K 97/12* (2013.01)

(58) Field of Classification Search
    CPC ........ A01K 97/12; A01K 97/01; A01K 97/10; A01K 97/08
    USPC ........................................ 43/17, 16, 21.2, 26
    See application file for complete search history.

(56) References Cited

U.S. PATENT DOCUMENTS

| | | | | |
|---|---|---|---|---|
| 2,032,537 A | * | 3/1936 | Kozikowski | A01K 97/125 43/16 |
| 2,834,140 A | * | 5/1958 | Knier | A01K 97/01 43/17 |
| 3,199,241 A | * | 8/1965 | Mauritz | A01K 97/12 43/17 |
| 3,474,561 A | * | 10/1969 | McConkey | A01K 97/01 43/16 |
| 4,021,958 A | * | 5/1977 | Snodie | A01K 97/12 43/17 |
| 4,845,878 A | * | 7/1989 | Hackel | A01K 97/01 43/17 |
| 5,050,333 A | * | 9/1991 | Debreczeni | A01K 97/10 43/15 |
| 6,094,852 A | * | 8/2000 | Roach | A01K 97/12 43/16 |

(Continued)

*Primary Examiner* — Darren W Ark
*Assistant Examiner* — Magdalena Topolski
(74) *Attorney, Agent, or Firm* — James M. Smedley LLC; James Michael Smedley, Esq.

(57) ABSTRACT

A fishing rod retention apparatus that includes an indicator for notifying a fisherman that a fish has been hooked. The apparatus includes a frame mounted on a base with at least one set of aligned fishing rod retention clips on each side of the frame. The frame includes a pair of converging frame portions, and a flag support spring attached to a bracket that connects the converging frame portions. A rotatable axle component with a retention spring at one end sits inside grooves in the converging frame portions. The axle component is used to hook the free end of a flag connected to the flag support spring while fishing line runs through the retention spring, such that a force applied to the fishing line causes the axle to rotate, thereby releasing the flag from the axle component.

12 Claims, 8 Drawing Sheets

(56) References Cited

U.S. PATENT DOCUMENTS

| | | | |
|---|---|---|---|
| 6,421,948 B1 * | 7/2002 | Craig | A01K 97/01 248/231.51 |
| 8,375,621 B1 * | 2/2013 | Tarr | A01K 97/12 43/16 |
| 2007/0169394 A1 * | 7/2007 | Keller | A01K 97/01 43/17 |
| 2011/0056112 A1 * | 3/2011 | Christianson | A01K 97/01 43/17 |
| 2012/0291332 A1 * | 11/2012 | Nolf | A01K 97/01 43/17 |

* cited by examiner

FISHING POLE HOLDER AND ALERT SYSTEM FOR ICE FISHING

CROSS REFERENCE TO RELATED APPLICATIONS

This application is a continuation-in-part of U.S. patent application Ser. No. 13/549,098 filed Jul. 13, 2012 and entitled "Fishing Rod Carrier and Cover Therefore", the entire disclosure of which is incorporated herein by reference.

This application claims the benefit of U.S. Provisional Patent Application No. 61/844,415 filed Jul. 9, 2013 and entitled "Fishing Pole Holder and Alert System for Ice Fishing" the entire disclosure of which is incorporated herein by reference.

FIELD OF INVENTION

The present invention generally relates to a fishing pole holder for ice fishing. Specifically, embodiments of the present invention provide a fishing rod holder with an alert system to notify a fisherman that a fish has been hooked.

BACKGROUND OF THE INVENTION

Ice fishing presents a number of unique challenges due to the cold conditions and small size of the hole in the ice through which the fisherman seeks to catch fish. Existing ice fishing systems have the fishing line built in and the system sits in the ice hole partially submerged in the water of the ice fishing hole. When a fish is hooked, the fisherman has to pull the entire mechanism out of the ice hole and land the fish by hand. Pulling up the mechanism and landing the fish by hand in freezing cold water is uncomfortable and can cause injury to the fisherman's hands. While this special equipment is often used for ice fishing, some fishermen prefer to use standard rods and reels for ice fishing. Due to the cold, it is often desirable to put down the fishing rod and wait for the fish to bite before picking up the rod and reel.

Therefore, there is a need in the art for a fishing rod holder that can be used for ice fishing. In particular, it is desirable for the holder to enable predominantly hands-free fishing and include an indicator to notify the fisherman that a fish has taken the bait and is on the hook so that the fisherman knows when to pick up the fishing pole. These and other features and advantages of the present invention will be explained and will become obvious to one skilled in the art through the summary of the invention that follows.

SUMMARY

Accordingly, it is an object of the present invention to provide an apparatus that holds one or more fish rods and further includes an integrated alert system that notifies a fisherman when a fish has been hooked on one of the fishing rods being held by the holder apparatus.

According to an embodiment of the present invention, an indicator system for a fishing rod holder, the indicator system comprising: a flag assembly comprising, a flag staff with a first end attached to an indicator signal and a second end attached to a first end of a spring element, wherein the spring element is configured to move the flag staff between a first position and a second position, and a flag base forming a support structure for the spring element, the flag staff, and the indicator signal, wherein the flag base is attached to the fishing rod holder and a second end of the spring element, and an axle component rotatably engaged with the fishing rod holder and comprising a grip portion formed at a first end of the axle component, a line retaining element attached to a second end of the axle component, and a notch forming a bend on the axle component that is located in between the first end of the axle and the second of the axle, wherein notch is adapted to reversibly engage with the first end of the flag staff to hold the flag staff is the second position.

According to an embodiment of the present invention, the axle component is held between two adjacent leg portions of the fishing rod holder within a grove formed in each of those leg portions.

According to an embodiment of the present invention, the indicator signal is an indicator flag.

According to an embodiment of the present invention, the flag staff is a metal rod sufficiently flexible to be moved between the first and the second position.

According to an embodiment of the present invention, the first end of the spring element forms a flag staff base from which the flag staff is formed.

According to an embodiment of the present invention, the spring element is a coiled spring.

According to an embodiment of the present invention, the line retaining element is configured to receive a fishing line.

According to an embodiment of the present invention, the line retaining element is a retaining spring attached to the axle component.

According to an embodiment of the present invention, an indicator system for a fishing rod holder, the indicator system comprising: a flag assembly comprising, a spring element attached between a first end of the flag base and a first end of a flag staff, wherein the spring element is configured to move the flag staff between a first position and a second position, wherein a second end of the flag base attaches to the fishing rod holder forming a support structure for the spring element and the flag staff, and an axle component rotatably engaged within a grove formed in each of two adjacent leg portions of the fishing rod holder, wherein the axel component is adapted to reversibly engage with a second end of the flag staff to hold the flag staff is the second position.

According to an embodiment of the present invention, the first end of the spring element forms a flag staff base from which the flag staff is formed.

According to an embodiment of the present invention, the flag base is formed from a flat wall of material with a projection extending perpendicularly from the flat wall.

According to an embodiment of the present invention, the flag assembly is further comprised of an indicator signal attached to the second end of the flagstaff According to an embodiment of the present invention, the indicator signal is an indicator flag.

According to an embodiment of the present invention, the axle component is comprised of a grip portion formed at a first end of the axle component, a line retaining element attached to a second end of the axle component, and a notch forming a bend on the axle component that is located in between the first end of the axle and the second of the axle.

According to an embodiment of the present invention, the line retaining element is a retaining spring attached to the axle component.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED DESCRIPTION

Figure 1:
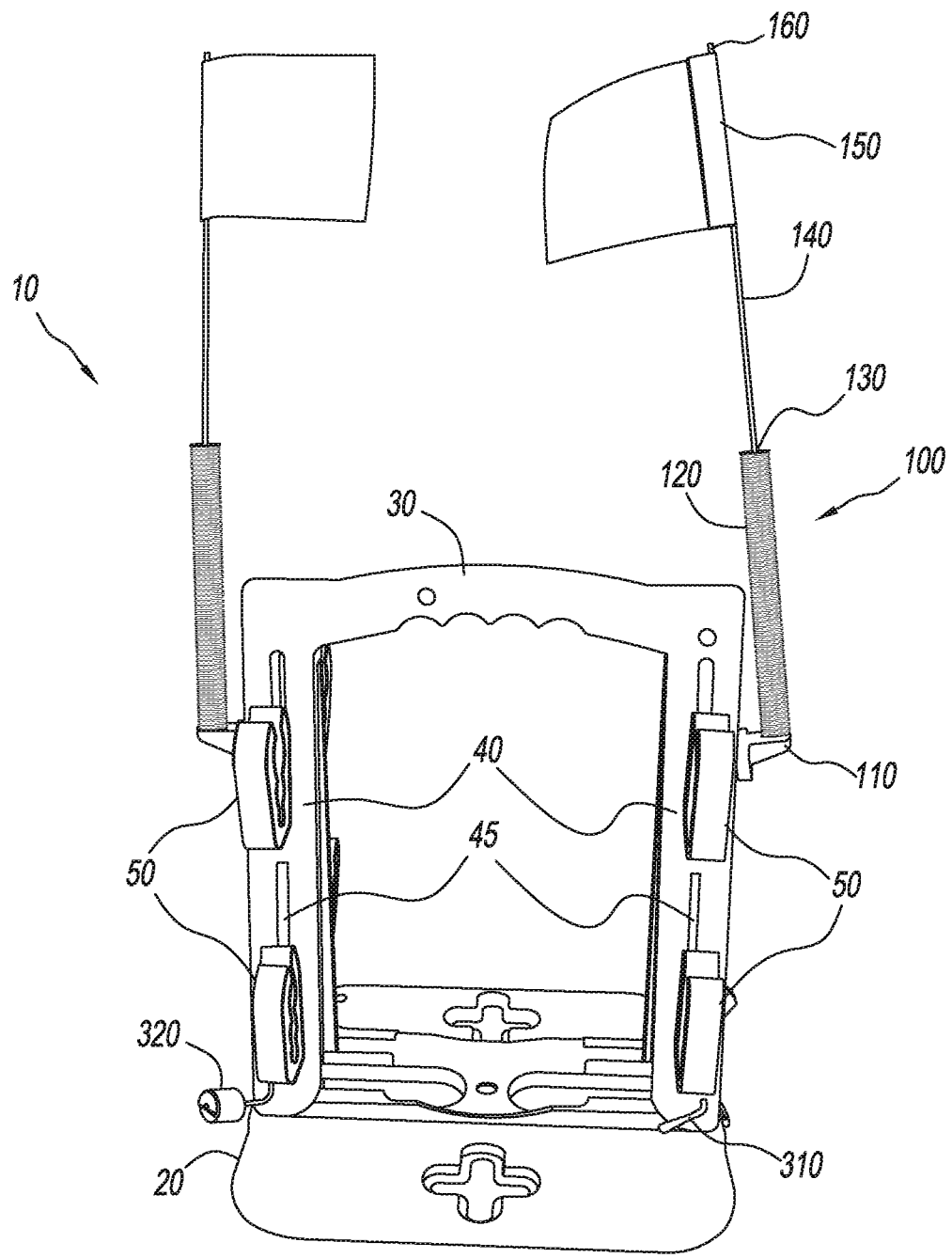
FIG. 1 shows a front view of an embodiment of the invention with both signal flags in an upright position.

The present invention generally relates to fishing pole holder for ice fishing. Specifically, embodiments of the present invention provide a fishing rod holder with an alert system to notify a fisherman that a fish has been hooked.

According to an embodiment of the present invention, a fishing rod holder is comprised of a carrier unit that is structure configured to hold and organize a plurality of fishing rod assemblies. In a preferred embodiment, the carrier unit comprises a base having an upper side with two troughs formed thereupon and a lower side configured to rest stably on a surface. In the preferred embodiment, the carrier unit also has a first leg frame and a second leg frame that are substantially identical to each other. In the preferred embodiment, each leg frame has a first leg portion, a second leg portion, a handle portion that connects the handle ends of the leg portions, and a strut portion that connects the attachment ends of leg portions (opposite the handle ends thereof). In the preferred embodiment, the strut portion has dimensions that permit it to fit into one of the troughs in the base. One of ordinary skill in the art would appreciate that there are many suitable designs for a carrier unit, and embodiments of the present invention are contemplated for use with any such design.

According to a preferred embodiment of the present invention, screws are used to attach each of the strut portions to one of the troughs formed in the base, thereby causing the leg portions to project away from the base. In the preferred embodiment, screws are also used to connect the handle portion of the first leg frame to the corresponding handle portion of the second leg frame to form a handle. Other means of connection include, but are not limited to nuts, bolts, adhesives, rivets, and snap-fit connections. One of ordinary skill in the art would appreciate that there are many suitable connections means that could be used to assemble the carrier unit, and embodiments of the present invention are contemplated for use with any such connection means.

According to a preferred embodiment of the present invention, leg portions of each of the leg frames forms an A-frame structure that resists distortion. Furthermore, forming the leg portions with U-channel cross sections adds structural rigidity without adding weight. One of ordinary skill in the art would appreciate that there are many suitable designs for the leg frames, and embodiments of the present invention are contemplated for use with any such design.

According to an embodiment of the present invention, the carrier unit may feature further include a storage box. In a preferred embodiment, the storage box is adapted to be held in place within a well formed in the base between the strut portions of the leg frames. The storage box may be configured with a box attachment feature that cooperates with a corresponding base attachment feature that is formed in the well to retain the storage box. In some embodiments, the well grips the walls of the storage box with an interference fit to provide the retention feature.

According to an embodiment of the present invention, the base may include a storage feature or surface attachment point that allows a user to mount the carrier on a surface such as a wall or dock. In a preferred embodiment, each storage feature comprises crossed slots with an opening at the crossing point larger than either slot's width. In the preferred embodiment, a screw may be inserted part way into a wall with a head smaller than the crossing point opening but larger than the slots' width thereby allowing the carrier to be temporarily attached to the wall, a boat deck, or a dock. One of ordinary skill in the art would appreciate that other types of storage features are possible as well.

According to an embodiment of the present invention, each of the leg portions of each of the leg frames have a plurality of first clip attachment features. In a preferred embodiment, the first clip attachment features are apertures or attachment slots that are formed in and extend along the length of the leg portions of the leg frames. In an alternate embodiment, the first clip attachment features may be comprised of attachment projections. In the preferred embodiment, there are two attachment slots formed in each leg portion, which are positioned in approximate horizontal alignment with a pair of similar attachment slots on the second leg portion of the same leg frame. As an illustrative example, "in alignment" is meant that for a particular slot on first leg portion there is a slot on the second leg portion of that same leg frame that is similarly spaced from base. One of ordinary skill in the art would appreciate note that first clip attachment features may take a variety of forms.

According to a preferred embodiment of the present invention, each slot has an enlargement at one end thereof with a width larger than found along the remainder of the slot. The enlargement allows a projection from a clip element (described below) to be inserted into and slipped along the length of a slot.

According to an embodiment of the present invention, an individual rod assembly may be held by a pair of clip elements or clips. In a preferred embodiment, each slot is designed to accept a projection of a single clip element, which can slide within and frictionally maintain any one of a range of desired positions within the slot involved. In the preferred embodiment, each clip element has a second attachment feature comprising a projection. This second attachment feature, whatever its structure, mates with one of the first attachment features such as slot to secure the clip element to leg portion of a leg frame. One of ordinary skill in the art would appreciate that there are many suitable designs for corresponding first and second attachment features, and embodiments of the present invention are contemplated for use with any such designs.

According to an embodiment of the present invention, the carrier unit may feature clip elements. In a preferred embodiment, each clip has a rod holding feature comprising a holding slot that is designed for receiving and detachably retaining a rod assembly. As an illustrative example, "receiving and detachably retaining" is meant that a rod assembly can be inserted into and removed from the holding slots with force easily provided by a human, and yet is held with sufficient force to prevent inadvertently detaching during normal handling. In the preferred embodiment, each rod assembly is to be held by two clips on separate leg portions of a single leg frame. For transport, the expectation is that the clips holding a single rod assembly will be in approximate alignment with each other. As an illustrative example, "in approximate alignment with each other" is meant that when a rod assembly is inserted in the slots of two clips held on two separate leg portions of a single leg frame, the rod assembly is positioned approximately parallel to base. In some instances, it may also be convenient to hold a rod assembly between clips on two separate leg portions of a single leg frame that are not in approximate alignment with each other (e.g. the upper clip on a first leg portion and the lower clip on a second leg portion).

According to a preferred embodiment of the present invention, a first clip on the first leg portion of a leg frame holds one of the handle, ferrule, and rod of a rod assembly, while a second clip on the second leg portion of the same leg frame holds another of the handle, ferrule, and rod of that rod assembly. In the preferred embodiment, clip elements hold a rod assembly securely, and at the same time have dimensions that allow a human to easily remove or detach a rod assembly from the holding slot of a clip.

According to a preferred embodiment of the present invention, a clip has a slot with a series of concave, arcuate, slot edge shapes with decreasing radii of curvature from the open to the closed end of the holding slot along each edge of the holding slot. In the preferred embodiment, the differing radii and the inherent flexibility or resilience of the material from which clip is made, allows a user to insert a rod assembly at virtually any point along the length of rod assembly into clip to securely retain the rod assembly. The clip can form a detent relationship with the rod assembly at any of the various diameters or sizes along the length of the rod assembly that securely retains the rod assembly, and at the same time allows the user to remove the rod assembly from the clip. The slot edge shapes and dimensions, and the resiliency of clip, allow the clip to receive and detachably retain various sizes of rod assembly handles, ferrules, and rods. As an illustrative example, the outer or widest edge portion may receive and detachably retain the handle portion of a rod assembly, the middle edge portion may receive and detachably retain the ferrule portion of a rod assembly, the inner or narrowest edge portion may receive and detachably retain the rod portion of a rod assembly. One of ordinary skill in the art would appreciate the clips could accommodate a wide variety of rod assembly sizes.

According a preferred embodiment of the present invention, the second attachment feature on the clip element comprises a projection. In the preferred embodiment, the second attachment feature mates with one of the first attachment features to secure the clip element to a leg portion of the leg frame. In the preferred embodiment, the projection includes an outer flange and an inner flange that define between them a channel. The projection fits into a slot on the leg portion through an enlargement of the slot, so as to allow the clip to enter and slide within the slot. The outer flange should be small enough to pass through enlargement, while the inner flange should be too large to pass through the enlargement. Friction between the outer and inner flange and the edge of the slot, should be sufficient to prevent a force that is below a preselected level, with the level being what is required to urge the clip to slide within the slot. This preselected force level should be substantially greater than half the weight of a rod assembly, but small enough to allow a user to easily slide the clip to any desired position along the slot. In one version of carrier, this force is around 10 lbs. (4.55 kg.), but a resisting force of between 8 lbs. (3.64 kg.) and 15 lbs. (6.82 kg.) is acceptable.

According to an embodiment of the present invention, the leg frames may comprise polyvinyl chloride (PVC) of the type having some flexibility, but yet able to resist transverse force of a few pounds with only a little deflection. One of ordinary skill in the art would appreciate that there are many suitable materials for the leg frames, and embodiments of the present invention are contemplated to be formed from any suitable material.

According to an embodiment of the present invention, the clip elements should be flexible or semi-rigid. A suitable design for the clips will provide a resisting force of a few pounds when inserting or removing a rod assembly. The gripping force of a clip element should hold any portion of a rod assembly securely enough to prevent inadvertently detaching from the clip elements during normal or even moderately rough handling. At the same time, the force required to remove a rod assembly should be low enough to allow typical users to remove rod assemblies with moderate force. In a preferred embodiment, a mixture of PVC and polypropylene ethylene (PPE) provides such characteristics for the clips. A relatively wide range of ratios of the two materials in the mixture forming the clips will usually be successful as the constituent thereof. The shape and dimensions of the clip elements impact these design aspects as well. One of ordinary skill in the art would appreciate that there are many suitable materials for the clips, and embodiments of the present invention are contemplated to be formed from any suitable material.

According to an embodiment of the present invention, the carrier unit may include a cover that protects the reels of the rod assemblies from snagging on or bumping into adjacent surfaces of all types, possibly damaging them. In a preferred embodiment, the cover comprises fabric such as canvas or other durable material which can be sewn into the substantially parallelepiped shape. In the preferred embodiment, the cover comprises a top panel, side panels joined at the top edges the top panel, and an end panel joined at the top edge to top panel and at the side edges of both the side panels, thereby forming an enclosure the surrounds the carrier unit at the top and on three sides. The preferred embodiment of the cover has an open end opposite of the end panel that allows rod assemblies supported by carrier to project outwardly from within cover. The cover may have an opening on the top panel through which the handle of the carrier projects.

A number of variations on this design are possible. For example, one rather than two leg frames may be provided. Leg portions could be separate elements rather than forming a part of a leg frame. More than two slots, or even one slot may be provided on a leg portion. Different types of attachment between clips and leg portions are possible as well. In some embodiments, the clips could be integral with the leg portions rather than detachable.

According to an embodiment of the present invention, the carrier unit may be further comprised of an alert system. In a preferred embodiment, the alert system is comprised of a flag assembly or similar indicator system that is used to notify a fisherman when a fish has been hooked. In the preferred embodiment, the carrier unit is used to hold a rod assembly while the line is in the water, so that the fisherman is not required to hold the rod assembly while waiting for a fish to be hooked. This may be especially useful for ice fishing, thereby enabling a fisherman to keep his hands covered and warm. One of ordinary skill in the art would appreciate there are many useful benefits for an alert system on a rod assembly carrier unit, and embodiments of the present invention are contemplated to take advantage of any such benefit.

According to an embodiment of the present invention, the alert system is comprised of one or more flag assemblies attached to the leg frames of the carrier unit. In the preferred embodiment, the flag assembly is comprised of a flag base, a spring, a flag staff base, a flag staff, an indicator flag, and a flag staff tip. In the preferred embodiment, the flag base is attached to the two leg frames, preferably by screws or the like. The spring element (which could be any semi-rigid, yet flexible component (e.g. a coil spring, flexible shaft, or similar contrivance)) is then attached to top side of the flag base. In the preferred embodiment, this spring is capable of being bent easily while returning to an upright position when released. The upper end of the spring holds the flag staff base. Flag staff base may be a generally cylindrical portion to which the flag staff is molded or attached. The flag staff base may be glued or otherwise securely fixed to the upper end of the spring. In the preferred embodiment, the flag staff base holds a flag staff which is preferably a stiff metal rod. An indicator flag or similar signal may be attached to the top end of the flag staff by any suitable means. In a preferred embodiment, the indicator flag is a bright color, such as safety orange. In some embodiments, the indicator signal may be the flag staff itself, without any flag or other sign attached thereto. The end of the flag staff terminates at a tip that extends beyond the flag. One of ordinary skill in the art would appreciate there are many suitable configurations for a flag assembly, and embodiments of the present invention are contemplated for use with any such configurations.

According to an embodiment of the present invention, the alert system is comprised of one or more axles that is configured to rest in grooves formed at the base of each leg portion of each of the leg frames. Specifically, an axle will be inserted so that it rests simultaneously in both a groove formed in the base of the first leg portion of the first leg frame and also in a groove formed in the base of the first leg portion of the second leg frame. Essentially, the axle rests in a groove formed in the corresponding leg portions of two opposing leg frames. In a preferred embodiment, the axle includes a grip portion, a V-shaped notch, and a line retaining element. In the preferred embodiment, the line retaining element is a retaining spring attached to or otherwise formed on the end of the axle opposite the grip portion. The V-shaped notch is located approximately half-way between the grip and the line retaining element. One of ordinary skill in the art would appreciate there are many suitable designs for an axle, and embodiments of the present invention are contemplated for use with any such design.

Exemplary Embodiment

According to an embodiment of the present invention, the fishing rod holder with an alert system is more efficient that other ice fishing methods. In particular, the fisherman no longer has to land a fish using his bare hands. The fisherman can auger out two holes in the ice and place a baited line from each rod in a hole. When a fish bites, the flag system will pop up, alerting the fisherman that there is a fish on one of the rods. The fisherman can then reel in the fish using his rod and reel instead of pulling up the fish line by hand to land the fish.

According to a preferred embodiment of the present invention, the fishing rod holder with an alert system holds up to two rods and reels at the same time. In the preferred embodiment, the rods and reels are held by gripping clips and the rods face in opposite directions. This allows the equipment to remain organized, untangled and off the ice. An alert system uses an indicator flag that pops up when a fish is on the line, alerting the fisherman to remove the rod and reel and land the fish. The fishing rod holder may also be used as a carrier to store ice fishing rod and reels. The carrier may be hung on the wall when not in use to help keep the equipment protected from damage and off the ground.

As shown in FIG. 1, the fishing rod carrier 10 comprises a base 20 with two slightly rectangular frame portions that are angled towards one another to meet at the top, forming a handle 30. From a side view (see FIG. 2) these two frame portions define an acute triangle. Each vertical wall 40 of the frame portions 20 includes two slots 45 each holding a clip device 50. The clip devices 50 can hold fishing implements of various diameters and are arranged to be in two parallel rows with the clip on the other side of the frame.

Figure 2:
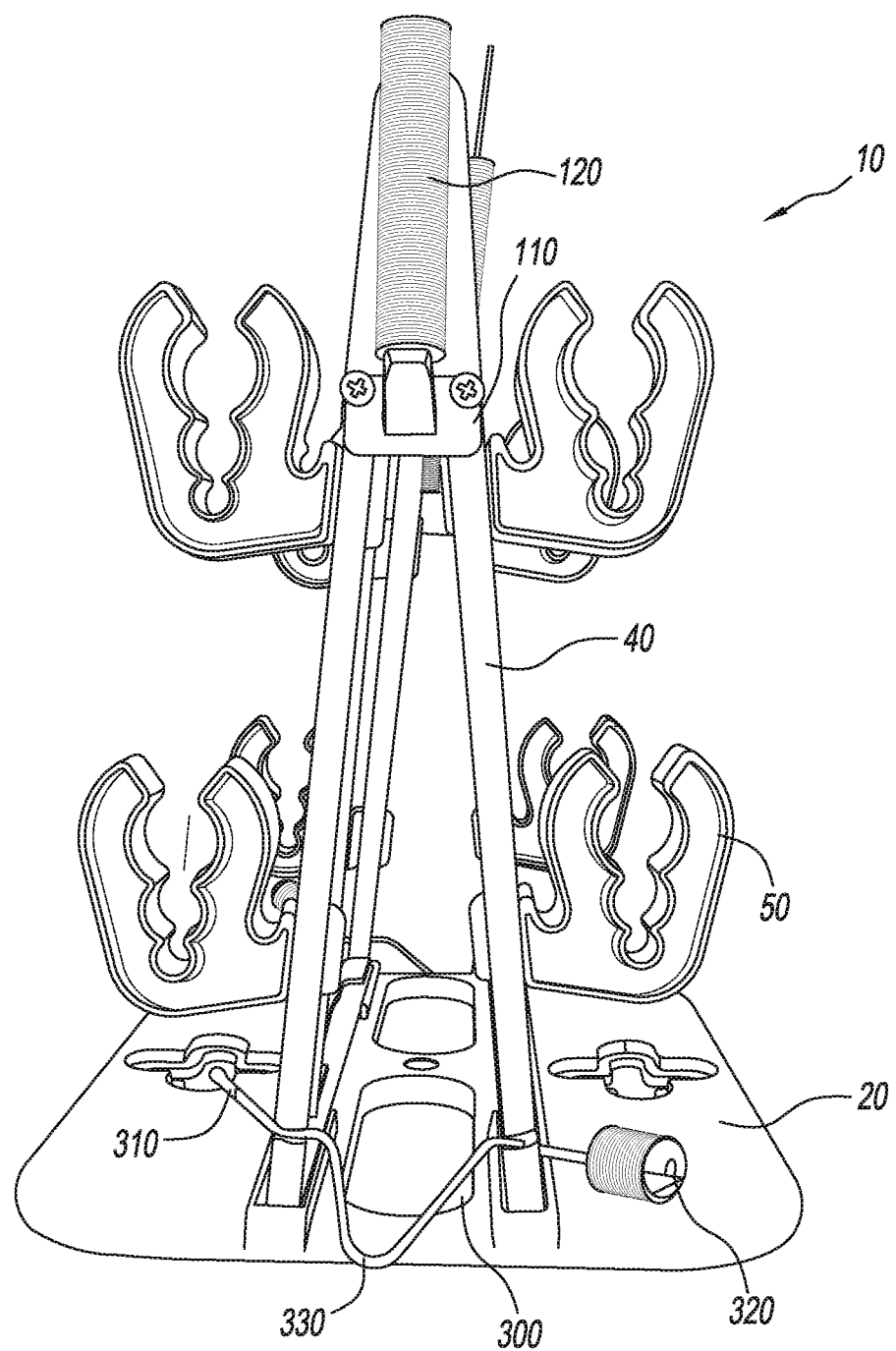
FIG. 2 is a side view of an embodiment of the invention.

Turning to FIGS. 1 and 2, in an embodiment of the current invention the fishing rod holder 10 includes two flag assemblies 100 near the top of the acute triangle defined by the two frame halves. As shown in FIG. 2, the flag assembly includes a flag base 110 attached to the two legs of the frame, preferably by screws or the like. A spring 120 is attached to top side of the flag base. This spring is capable of being bent easily while returning to an upright position when released. The upper end of the spring 120 holds the flag staff base 130. The flag staff base 130 may be a generally cylindrical portion to which the flag staff 140 is molded or attached. The flag staff base 130 is glued or otherwise securely fixed to the upper end of the spring 120. The flag staff base 130 holds a flag staff 140 which is preferably a stiff metal rod. An indicator flag 150 is attached to the top end of the flag staff 140 by any suitable means. In the preferred embodiment, the indicator flag 150 is preferably a bright color, such as safety orange. The end of the flag staff 140 has a tip 160 that extends beyond the flag 150.

Figure 3:
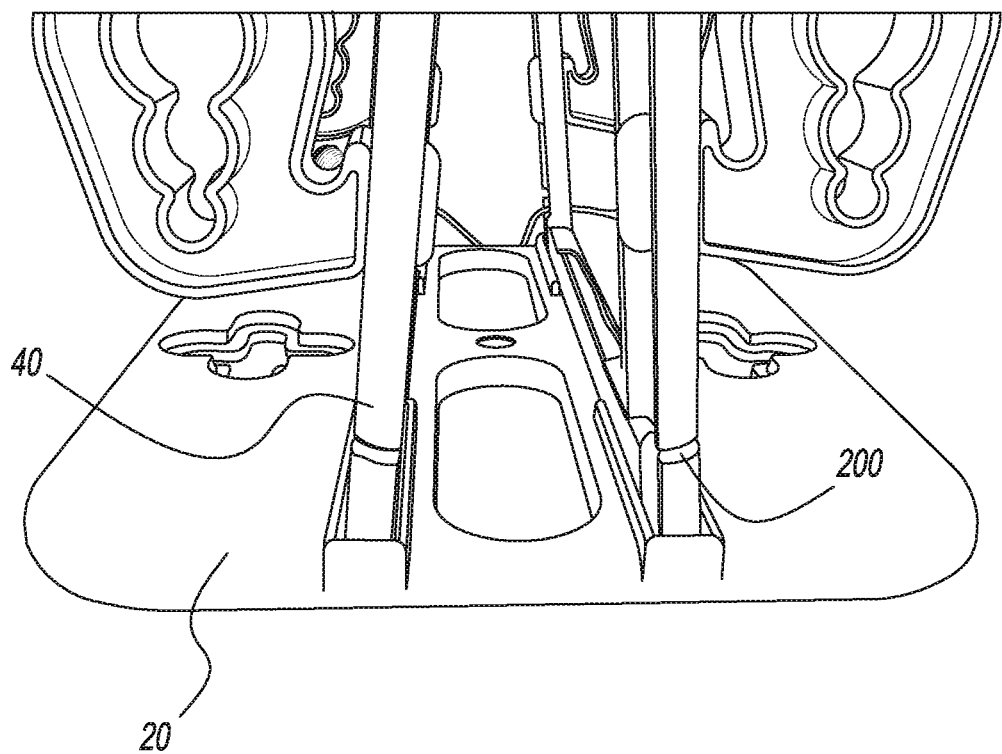
FIG. 3 is a close up side view of an embodiment of the invention with the retaining axle removed.
Figure 4:
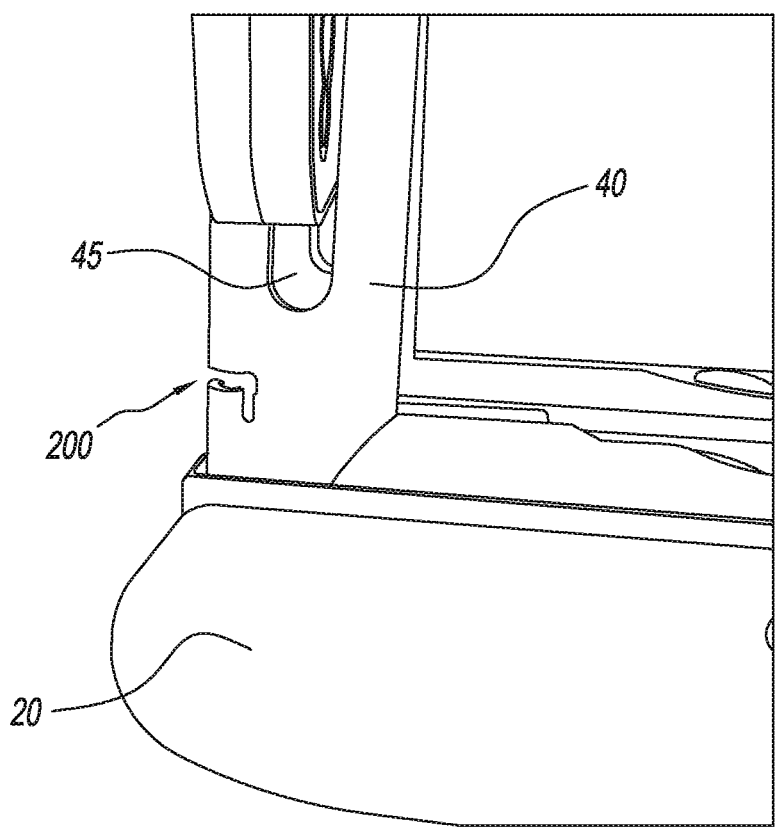
FIG. 4 is an offset view of one leg of the invention showing the groove in which the axle is held.
Figure 7:
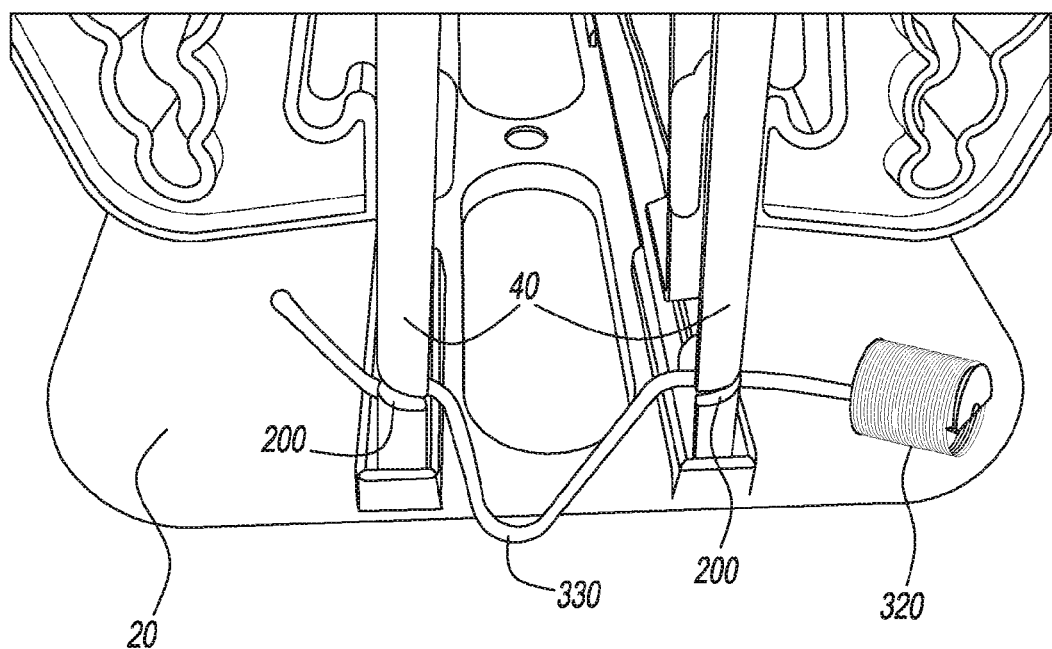
FIG. 7 is a close-up view of the axle in its groove.
Figure 8:
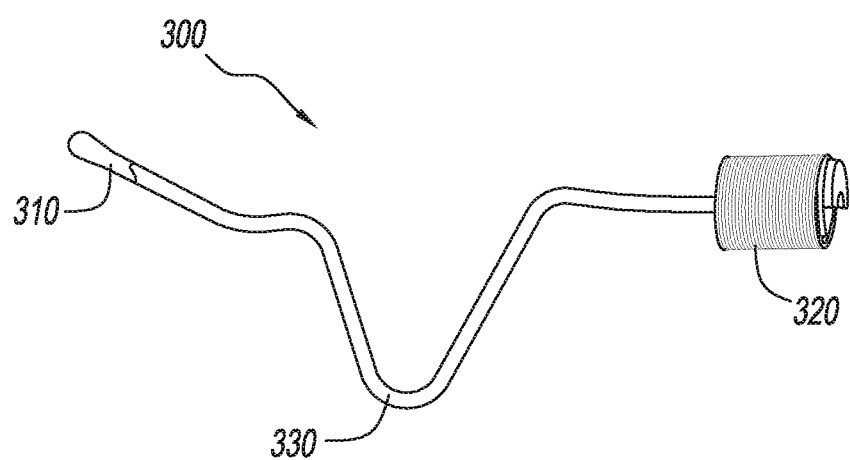
FIG. 8 is a view of the axle when removed from fishing rod holder.

As shown in FIGS. 3 and 4, near the base of the frame portions 20, each vertical wall 40 has a groove 200 that initially extends parallel to the base 20 and then turns downward at right angle. In a preferred embodiment, the groove 200 retains an axle 300 (See FIG. 8). As shown in FIG. 8, one end of the axle 300 includes a grip 310 and the other end terminates in retaining spring 320. As show in FIG. 7, the axle 300 contains a generally V-shaped notch 330 in its center portion that is held between the two vertical walls 40 when the axle is in groove 200. Preferably, the V-shaped notch 330 is in a plane approximately orthogonal to the plane in which the retaining spring 320 projects.

Figure 5:
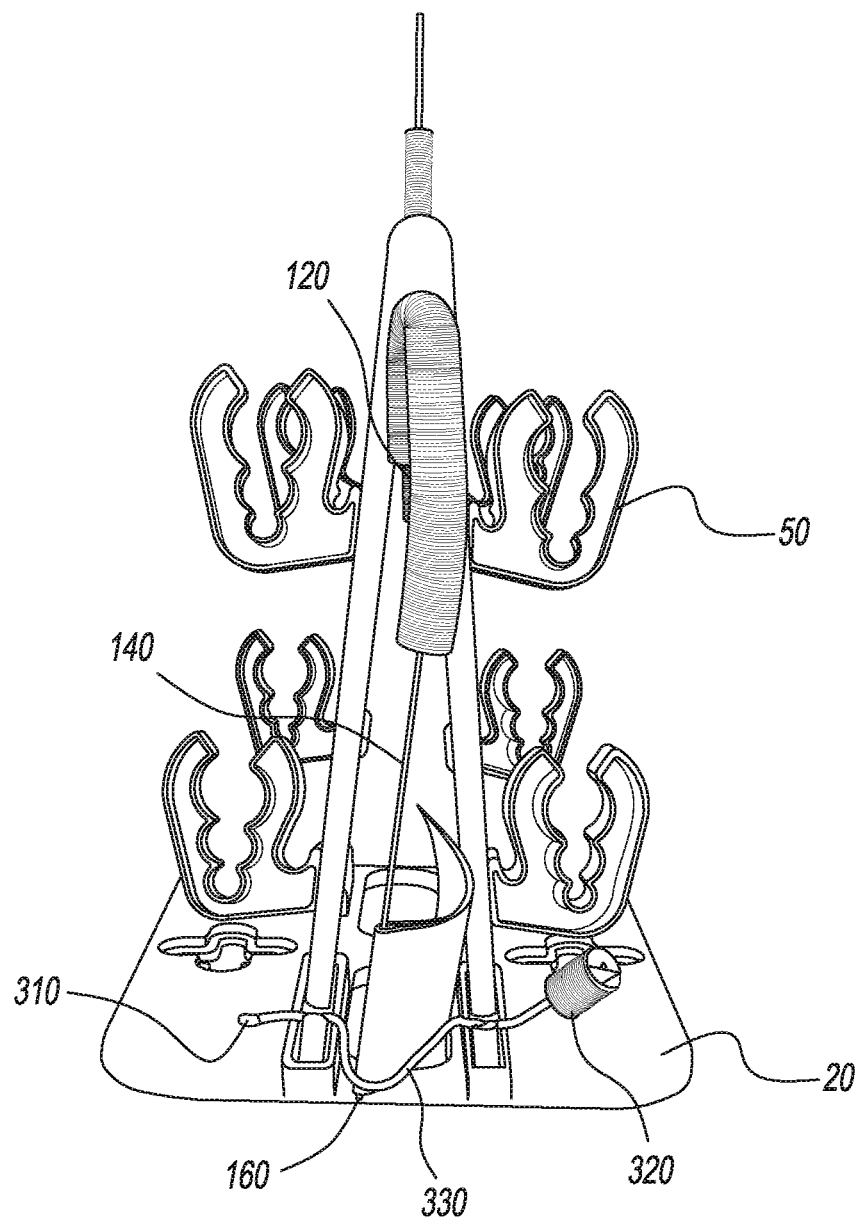
FIG. 5 is a side view of an embodiment of the invention showing the V-shaped notch in the axle retaining the signal flag.
Figure 6:
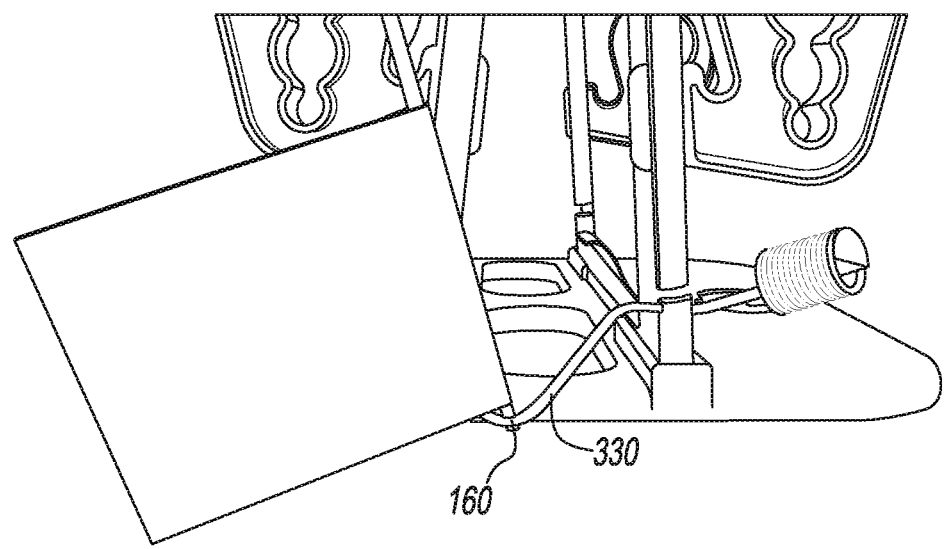
FIG. 6 is a close up view of an embodiment of the invention showing the flag staff tip being retained by the V-shaped notch in the axle.

To use the fishing alert signal, the user grabs flag staff 140 and pulls it downward, bending the spring 120 until the flag staff tip 160 is pointing towards the base 20, as shown in FIGS. 5 and 6. The user then rotates the axle 300 using the grip 310 and positions the flag staff 140 so that the flag staff tip 160 is retained by V-shaped portion 330, preventing the flag assembly 100 from returning to its upright position. The V-shaped portion 330 of the axle 320 is preferably in a plane parallel to the base 20 in this position and the retaining spring 320 is preferably perpendicular to the ground and pointing upright. A fishing line (not shown) is then run through the retaining spring 320 with the hook end in the ice fishing hole and the rod held by the clip devices 50. [These steps may also be reversed.]

When a fish bites on the hook, it pulls the fishing line causing the axle 300 to rotate as the retaining spring 320 is pulled downward. In the preferred embodiment, the rotation of the axle 300 then results in the flag staff tip 160 being released from V-shaped notch 330 as it also rotates downward. The flag staff 140 then springs back to its upright position, notifying the fisherman that there is a fish on the line.

While multiple embodiments are disclosed, those skilled in the art will appreciate that the present invention may be subject to variations and modifications other than those specifically described. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A fishing rod retention apparatus with fish indicator, the apparatus comprising:
    a base;
    a frame mounted on said base, said frame comprising a pair of converging frame portions connected at their converging ends by a pair of brackets, each of the brackets on an opposite side of the frame, wherein each of the frame portions comprises at least one set of aligned fishing rod retention clips;
    a flag support spring connected to at least one of said brackets, said flag support spring forming a base for a flag that extends from said flag support spring,
        wherein the bottom portion of each frame includes an L-shaped groove;
    a curvilinear axle component having a bowed portion with arms extending therefrom, and a retaining spring at the end of one arm of said arms, wherein each arm of said arms is inserted in a corresponding one of said L-shaped grooves, so that said axle sits at the bottom of each L-shaped groove and said arms are free to rotate in said L-shaped groove,
        wherein during actual use of said device a flag extending from said flag support spring is hooked inside said curvilinear axle by bending at least one of said flag or said flag support spring and positioning an end of said flag inside said bowed portion of said curvilinear axle, and a fishing line is run through said retaining spring such that a force applied to said fishing line by a hooked fish causes said axle to rotate in said groove, thereby releasing said flag from said axle.

2. The apparatus of claim 1, wherein said flag comprises a metal rod sufficiently flexible to be moved between a first and said second position.

3. The apparatus of claim 1, wherein an end section of one of said axle arms defines a grip portion.

4. The apparatus of claim 1, wherein each of the brackets includes a ledge for supporting a corresponding flag support spring.

5. The apparatus of claim 1, wherein said flag comprises an elongated member.

6. The apparatus of claim 1, wherein said flag consists of an elongated member.

7. A fishing rod retention apparatus with fish indicator, the apparatus comprising:
    a frame mounted on said base, said frame comprising a pair of converging frame portions, wherein each converging frame portion comprises at least one set of aligned fishing rod retention clips;
    a flag support spring attached to a bracket that connects each of said converging frame portions, said flag support spring forming a base for a flag that extends from said flag support spring;
    a rotatable axle component with a retention spring at one end, wherein said axle component spans across a space between each of said converging frame portions and sits inside respective grooves in said each of said converging frame portions, wherein said axle component is used to hook an end of said flag, while a fishing line runs through the retention spring, such that a force applied to the fishing line causes the axle to rotate, thus releasing the flag from the axle component.

8. The apparatus of claim 7, wherein each of said respective grooves is formed in a bottom side of each frame portion.

9. The apparatus of claim 7, wherein an end section of said axle component defines a gripping portion.

10. The apparatus of claim 7, wherein said flag comprises an elongated member.

11. The apparatus of claim 7, wherein said flag consists of an elongated member.

12. The apparatus of claim 7, wherein said bracket comprises a ledge for supporting said flag support spring.

* * * * *